United States Patent
Lagnado et al.

(10) Patent No.: US 7,882,377 B2
(45) Date of Patent: Feb. 1, 2011

(54) ELECTRONIC DEVICE WITH FLEXIBLE PROCESSING SYSTEM

(75) Inventors: Isaac Lagnado, Houston, TX (US); Yogesh K. Mittal, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 896 days.

(21) Appl. No.: 11/799,378

(22) Filed: Apr. 30, 2007

(65) Prior Publication Data

US 2008/0270810 A1    Oct. 30, 2008

(51) Int. Cl.
*G06F 1/32* (2006.01)
*G06F 1/00* (2006.01)
*H04K 1/00* (2006.01)

(52) U.S. Cl. .................. 713/320; 713/100; 380/270
(58) Field of Classification Search .......... 713/320
See application file for complete search history.

(56) References Cited

U.S. PATENT DOCUMENTS

| 7,152,171 B2* | 12/2006 | Chandley et al. ............ 713/320 |
| 7,245,725 B1* | 7/2007 | Beard ......................... 380/270 |
| 7,275,167 B2* | 9/2007 | Chandley et al. ............ 713/320 |
| 7,717,350 B2* | 5/2010 | Ober et al. .................. 235/492 |
| 7,733,221 B2* | 6/2010 | Ober ....................... 340/539.17 |
| 2003/0208676 A1* | 11/2003 | Bard et al. ...................... 713/2 |
| 2005/0066006 A1 | 3/2005 | Fleck et al. |
| 2005/0076256 A1 | 4/2005 | Fleck et al. |
| 2008/0004012 A1* | 1/2008 | Polzin et al. ............. 455/435.1 |
| 2008/0184042 A1* | 7/2008 | Parks et al. ................. 713/300 |

* cited by examiner

*Primary Examiner*—Suresh K Suryawanshi

(57) ABSTRACT

An electronic device comprising a host module and a wireless module each comprising a processing unit, wherein the electronic device is configurable to be operated in a low processing mode by performing processing functions for the electronic device using the processing unit of the wireless module.

20 Claims, 2 Drawing Sheets

ELECTRONIC DEVICE WITH FLEXIBLE PROCESSING SYSTEM

BACKGROUND

Users often desire to have long-lasting electronic devices that operate for long periods of time without having to recharge. This eliminates the hassles associated with finding an electrical outlet when the batteries run low or finding the corresponding power cable for the particular electronic device.

DETAILED DESCRIPTION OF THE DRAWINGS

Figure 1:
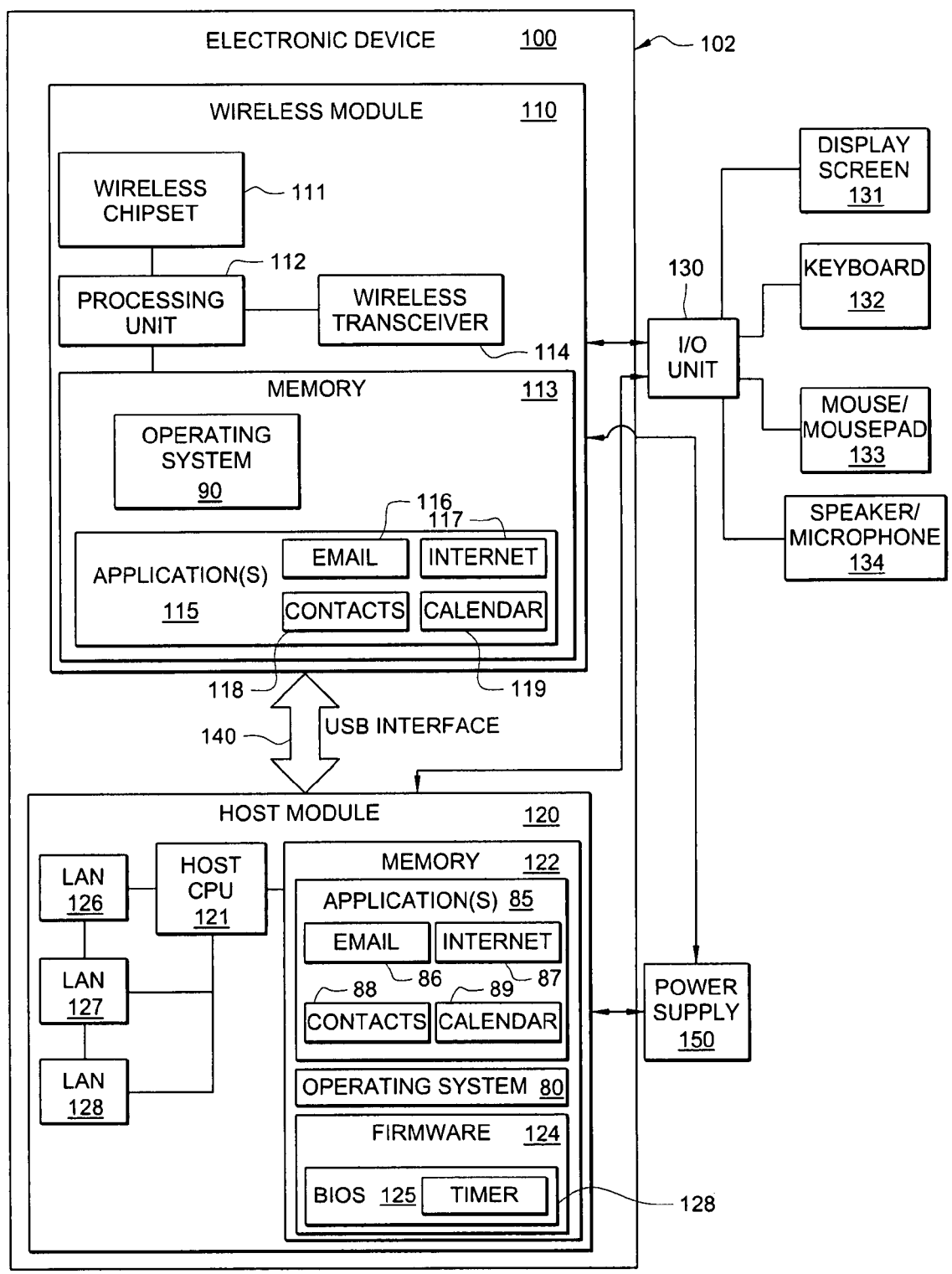
FIG. 1 is a block diagram of an electronic device in which an embodiment of a flexible processing system is employed to advantage.

FIG. 1 is a block diagram of an electronic device 100 comprising an embodiment of a flexible processing system 102. Electronic device 100 is configured to provide a user with an option to operate electronic device 100 in either a low processing mode of operation or in a normal processing mode of operation using flexible processing system 102. Electronic device 100 can be any type of electronic device, such as, but not limited to, a laptop computer, a tablet computer, a personal digital assistant (PDA), a cellular phone, a gaming device, or any type of portable or non-portable electronic device. In the illustrated embodiment, electronic device 100 comprises flexible processing system 102, an input/output (I/O) unit 130, and a power supply 150. It should be noted, however, that I/O unit 130 and power supply 150 can be coupled internally in or externally to electronic device 100.

In the illustrated embodiment in FIG. 1, flexible processing system 102 comprises a wireless module 110 and a host module 120. In some embodiments, components for electronic device 100 are a combined software and hardware embodiment. However, it should be noted that, in alternate embodiments, the components can be a hardware-only or a software-only embodiment. In some embodiments, wireless module 110 is an internally embedded printed circuit board (e.g., disposed within electronic device 100) used to manage the functions and systems for wireless communications (e.g., electronic mail and internet access) in electronic device 100. Alternatively, the features/functions of wireless module 110 can be in the form of an attached and/or detachable computer card (e.g., Personal Computer Memory Card International Association (PCMCIA) card or an ExpressCard).

Wireless module 110 is configured to enable electronic device 100 to process applications in a low processing mode of operation. A low processing mode is a state of operation of electronic device 100 that enables electronic device 100 to operate in a less power-consuming mode than in a normal processing mode. Wireless module 110 comprises a wireless chipset 111, a wireless processing unit 112, a memory 113, and a wireless transceiver 114. Wireless chipset 111 manages the flow of data signals in wireless module 110. Wireless processing unit 112 executes a set of instructions stored in memory 113 for operating electronic device 100 when electronic device 100 is in a low processing mode of operation. Memory 113 is a memory element which stores an operating system 90 and application(s) 115. Operating system 90 is a set of instructions which manages the resources available to electronic device 100 when operating in a low processing mode of operation. In some embodiments, operating system 90 comprises a list of a subset of devices, applications, functions, and/or features which are enabled and/or initialized when operating in a low processing mode of operation. In some embodiments, the subset of devices, functions, and/or features are a portion or part of all the devices, functions, and/or features available for use in a normal processing mode of operation. It should understood, however, that operating system 90 may use any other type of system to manage the available subset of devices. Application(s) 115 is a set of one or applications available to a user when operating in a low processing mode of operation. Application(s) 115 is configured to interact and communicate with operating system 90. In the illustrated embodiment, application(s) 115 comprise an email application 116, an internet application 117, a contacts application 118, and a calendar application 119. It should be understood, however, that, in alternative embodiments, application(s) 115 may comprise more, fewer, or different applications.

In some embodiments, each of email application 116, internet application 117, contacts application 118, and calendar application 119 comprise a portion or part of the features and/or functions which may be available when operating a normal mode of operation. For example, email application 116 may comprise a read function but not a compose and send function. In another example, internet application 117 may present text but not graphics for a webpage. In an alternative embodiment, processing unit 112 may copy an instance of application(s) 115 from host module 120 (e.g., enabling all and/or a portion of their respective functionality and/or otherwise configuring such instances for execution and/or interaction with operating system 90). Wireless transceiver 114 is any device (e.g., an antenna) which receives and transmits data wirelessly from another device. In some embodiments, wireless transceiver 114 uses a wireless wide area network (WWAN) as the communications protocol to wirelessly communicate with other devices. However, it should be noted that wireless transceiver 114 can use any type of communications protocol, such as, but not limited to, infrared, wireless, Bluetooth®, Wi-Fi®, and ultrawide band. (Bluetooth® is a registered trademark of Bluetooth Sig, Inc. in the United States of America and possibly other countries. Wi-Fi® is a registered trademark of the Wi-Fi Alliance in the United States and possibly other countries.)

In some embodiments, wireless module 110 couples to host module 120 via an universal serial bus (USB) interface 140. However, it should be noted that wireless module 110 may use any other type of bi-directional bus interface to facilitate communicates between wireless module 110 and host module 120. Host module 120 is the set of features, functions, and/or devices employed when electronic device 100 is operating in a normal processing mode of operation. A normal processing mode of operation is a state of operation for electronic device 100 in which a user may generally have full access to all functions and/or features of all applications and/or devices for electronic device 100.

Host module 120 comprises a host central processing unit (CPU) 121, a memory 122, a local area network (LAN) connection 126, a hard disk drive (HDD) 127, and a network interface card 128. CPU unit 121 is a set of one or more processors used to execute a set of instructions for electronic device 100. Memory 122 is any memory element (i.e. persistent storage) which stores a set of instructions to be executed by CPU unit 121 when electronic device 100 is operating in a normal processing mode of operation. In the illustrated embodiment, memory 122 comprises an operating system 80, application(s) 85, and firmware 124. Operating system 80 is a set of instructions which manages the resources available when operating electronic device 100 in a normal processing mode. Application(s) 85 is a set of one or more applications available to a user when electronic device 100 is in a normal processing mode of operation. In the illustrated embodiment, application(s) 85 comprises an email application 86, an internet application 87, a contacts application 88, and a calendar application 89. Each of email application 86, internet application 87, contacts application 88, and calendar application 89 is generally a full version or a version configured to communicate with operating system 80. Memory 122 also comprises firmware 124 which is a set of read-only operating instructions. In FIG. 1, firmware 124 comprises a Basic Input/Output System (BIOS) 125, which is the set of instructions executed when electronic device 100 initializes or boots up. In the illustrated embodiment, BIOS 125 is configured to enable a user to select whether to operate electronic device 100 in a low processing mode or a normal processing mode. In some embodiments, BIOS 125 comprises a timer 128, which is a counter that gives the user a pre-determined amount of time to decide when electronic device 100 initializes in which processing mode to operate. In some embodiments, if the timer expires before a decision is made, then BIOS 125 defaults to the normal processing mode. Alternatively, BIOS 125 can default to the low processing mode. It should be noted, however, that in some embodiments, timer 128 may be disposed and/or otherwise located elsewhere in electronic device 100 and/or omitted from BIOS 125.

Wireless module 110 and host module 120 are coupled to input/output (I/O) unit 130 and power supply 150. I/O unit 130 is a set of one or more interfaces and/or connections which enable peripheral devices to be coupled to electronic device 100. In the illustrated embodiment, I/O unit 130 is coupled to a display screen 131, a keyboard 132, a mouse/mousepad 133, and a microphone/speaker 134. However, it should be noted that I/O unit 130 can be coupled to more or fewer devices than the devices illustrated. Furthermore, it should also be noted that display unit 131, keyboard 132, mouse 133, and microphone/speaker 134 may be either internally or externally coupled to electronic device 100. Power supply 150 can be any type of power supplying device (e.g., an internal battery or an external power supply). Operating electronic device 100 in a low processing mode instead of in a normal processing mode reduces the power consumed from power supply 150.

Thus, in application, when electronic device 100 initializes, BIOS 125 is executed and prompts a user to determine whether to operate electronic device 100 in a low processing mode or a normal processing mode of operation. If the user chooses to operate in a low processing mode of operation, BIOS 125 initializes wireless module 110. Wireless module 110 then provides processing functions for electronic device 100 using a portion or subset of available devices, applications, and/or functions and features of electronic device 100 (e.g., application(s) 115). If, however, the user chooses to operate in a normal processing mode of operation, BIOS 125 initializes host module 120. Host module 120 then provides processing functions for electronic device 100 using generally all the available devices, applications, and/or functions and features of electronic device 100 (e.g., application(s) 85)).

In some embodiments, a user can switch to the low processing mode while in the normal processing mode and vice-versa. In one embodiment, a user switches operating modes by entering a command at an operating system prompt. Alternatively, display unit 131 may comprise a graphical icon which enables the user to switch operating modes by selecting the icon. In this embodiment, the graphical icon executes the set of instructions stored in BIOS 125 to initiate either the low processing mode or normal processing mode.

Figure 2:
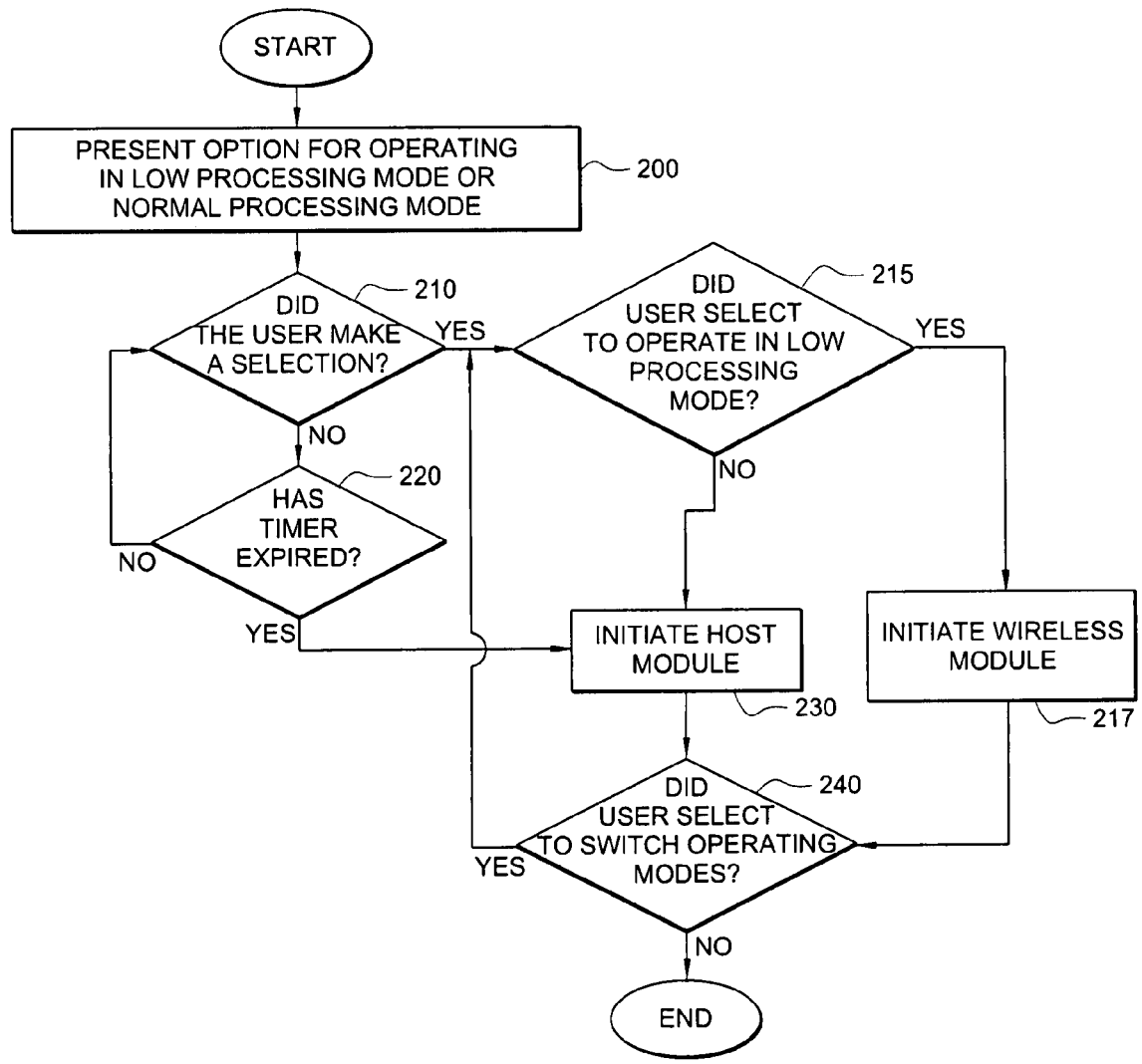
FIG. 2 is a flowchart of an embodiment of a flexible processing method.

FIG. 2 is a flowchart of an embodiment of a flexible processing method for electronic device 100. The method begins with block 200 with BIOS 125 presenting to a user the option for operating electronic device 100 in low processing mode or normal processing mode. BIOS 125 then determines whether the user made a selection as to which operating mode (block 210). If the user has made a selection ("yes" output to block 210), then BIOS 125 determines whether the user selected to operate in low processing mode (block 215). If the user has selected to operate in low processing mode ("yes" output to block 215), then BIOS 125 initiates wireless module 110 (block 217). BIOS 125 then determines whether the user selected to switch operating modes from low processing mode to normal processing mode (block 240). If the user has decided to switch ("yes" output to block 240), then BIOS 125 returns to decision block 215. However, if the user has not decided to switch ("no" output to block 240), the process terminates thereafter.

Returning to block 210, If the user has not made a selection ("no" output to block 210), then BIOS 125 determines whether timer 128 has expired (block 220). If timer 218 has not expired ("no" output to block 210), then BIOS 125 returns to block 210. If, however, timer 218 has expired ("yes" output to block 210), then the method proceeds to block 230 in which the BIOS 125 initiates host module 120. BIOS 125 then determines whether the user selected to switch operating modes (block 240). In other words, BIOS 125 determines whether the user has decided to switch from normal processing mode to low processing mode (block 240). If the user has not decided to switch operating modes ("no" output to block 240), then the method terminates thereafter. However, if the user has decided to switch operating modes ("yes" output to block 240), then the method returns to block 215.

The illustrative embodiments may be implemented in software and can be adapted to run on different platforms and operating systems. In particular, functions implemented by flexible processing system 102, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

The illustrative embodiments provide an electronic device, a method, and a computer-usable program code for flexible processing. The illustrative embodiments enable a user to select to operate in normal processing mode or low processing mode. As a result, a user can reduce power consumption in power supply 150 by limiting the available devices, applications, and/or features and functions within the application. Limiting the available devices can also benefit wireless performance since the un-used devices may generate unwanted noise (e.g., radio frequency noise) which could impact the overall wireless performance of electronic device 100.

What is claimed is:

1. An electronic device, comprising:
 a host module that comprises a processing unit and a memory that stores an operating system; and
 a wireless module that comprises a processing unit and a memory that stores an operating system, wherein the operating system of the wireless module operates the electronic device in a low processing mode of operation and the operating system of the host module operates the electronic device in a normal processing mode of operation.

2. The electronic device of claim 1, wherein the memory of the host module includes a Basic Input/Output System (BIOS) that upon initialization of the electronic device selects between operating in the normal processing mode of operation or the low processing mode of operation.

3. The electronic device of claim 1, further comprising firmware configured to enable a user to select to operate the electronic device in the low processing mode.

4. The electronic device of claim 1, further comprising firmware configured to present an option enabling a user to select to operate the electronic device in the low processing mode when the electronic device initializes.

5. The electronic device of claim 1, further comprising firmware configured to enable a user to switch processing modes after the electronic device initializes.

6. The electronic device of claim 1, wherein the memory of the host module stores an internet application, and the memory of the wireless module stores an internet application that has a subset of functions of the internet application stored in the host module.

7. The electronic device of claim 1, wherein the memory of the wireless module stores applications that include a portion of functions available when the electronic device operates in the normal processing mode of operation.

8. The electronic device of claim 1, wherein operation in the low processing mode comprises access to a subset of devices configured to interact with the operating system for the wireless module.

9. The electronic device of claim 1, wherein operation in the low processing mode comprises access to a subset of functions in a set of applications configured to interact with the operating system for the wireless module.

10. A flexible processing method, comprising:
 operating an electronic device in a normal processing mode of operation with a host module that includes a memory that stores an operating system and a processing unit that executes instructions to operate the electronic device in the normal processing mode of operation; and
 operating the electronic device in a low processing mode of operation with a wireless module that includes a memory that stores an operating system that executes instructions to operate the electronic device in the low processing mode of operation.

11. The method of claim 10, further comprising executing a Basic Input/Output System (BIOS) to select between operating in the normal processing mode of operation and operating in the low processing mode of operation.

12. The method of claim 10, further comprising presenting an option to a user to select to operate the electronic device in the low processing mode when the electronic device initializes.

13. The method of claim 10, further comprising enabling a user to switch processing modes after the electronic device initializes.

14. The method of claim 10, further comprising operating the electronic device in the low processing mode by using a set of applications configured to interact with the operating system for the wireless module.

15. The method of claim 10, further comprising operating the electronic device in the low processing mode by providing access to a subset of devices configured to interact with the operating system for the wireless module.

16. An electronic device, comprising:
 a host module including a first processing unit coupled to first memory that stores a first operating system that manages resources when the electronic device operates in a normal processing mode of operation; and
 a wireless module including a wireless chip that manages wireless data signals and a second processing unit coupled to second memory that includes a second operating system that manages resources when the electronic device operates in a low processing mode of operation.

17. The electronic device of claim 16, wherein the first memory stores a first email application and a first internet application, and the second memory stores a second email application and a second internet application that include only portions of functions available when the electronic device operates in the normal processing mode of operation.

18. The electronic device of claim 16, wherein the second operating system includes a subset of functions that are a portion of functions used in the normal processing mode of operation.

19. The electronic device of claim 16, wherein first memory includes a Basic Input/Output System (BIOS) that selects between operating in one of (1) the low processing mode of operation with the wireless module providing processing functions for the electronic device using a subset of devices, applications, and functions of the electronic device, and (2) the normal processing mode of operation with the host module providing processing functions for all of the devices, applications, and functions of the electronic device.

20. The electronic device of claim 16, wherein first memory includes a Basic Input/Output System (BIOS) that presents an option to operate the electronic device in either the low processing mode of operation or the normal processing mode of operation.

* * * * *